United States Patent [19]

Fechter et al.

[11] Patent Number: 4,852,629

[45] Date of Patent: Aug. 1, 1989

[54] COLD-BOX PROCESS FOR FORMING FOUNDRY SHAPES WHICH UTILIZES CERTAIN CARBOXYLIC ACIDS AS BENCH LIFE EXTENDERS

[75] Inventors: Robert B. Fechter; John J. Gardikes, both of Worthington, Ohio

[73] Assignee: Ashland Oil, Inc., Russell, Ky.

[21] Appl. No.: 195,562

[22] Filed: May 16, 1988

Related U.S. Application Data

[62] Division of Ser. No. 899,696, Aug. 25, 1986, Pat. No. 4,760,101.

[51] Int. Cl.$^4$ .............................................. B22C 9/00
[52] U.S. Cl. .................................... 164/16; 164/526; 523/143
[58] Field of Search .................................. 164/16, 526

[56] References Cited

U.S. PATENT DOCUMENTS 3,409,579 11/1968 Robins ................................. 164/16
4,590,229 5/1986 Gardikes ............................. 164/526

Primary Examiner—Lewis T. Jacobs
Attorney, Agent, or Firm—David L. Hedden

[57] ABSTRACT

Certain carboxylic acids are used in polyurethane-forming binder compositions to extend the bench life of such compositions. The binder compositions are particularly useful for preparing sand castings used for making foundry parts.

10 Claims, No Drawings

COLD-BOX PROCESS FOR FORMING FOUNDRY SHAPES WHICH UTILIZES CERTAIN CARBOXYLIC ACIDS AS BENCH LIFE EXTENDERS

This application is a division of application Ser. No. 899,696 filed Aug. 25, 1986, now U.S. Pat. No. 4,760,101 issued July 26, 1988.

TECHNICAL FIELD

This invention relates to polyurethane-forming binder compositions which are useful in the cold-box foundry fabrication process. They are used in the foundry industry to produce molds and cores from sand mixed with the binder. The polyurethane-forming binder compositions contain certain carboxylic acids which function as bench life extenders.

BACKGROUND ART

In the foundry industry, one of the procedures used for making metal parts is by sand casting. In sand casting, disposable molds and cores are fabricated with a mixture of sand and an organic or inorganic binder. The binder is usually used to strengthen the cores, which are the most fragile part of the mold assembly.

One of the fabrication processes used in sand casting is the cold-box process. In this process a gaseous curing agent is passed through a mixture of the sand and binder to cure the mixture.

A binder commonly used in the cold-box fabrication process is a polyurethane binder derived from curing a polyurethane-forming binder composition with a gaseous tertiary amine catalyst. The polyurethane-forming binder composition usually consists of a phenolic resin component and polyisocyanate hardener component which may react prior to curing with the gaseous catalyst. If this reaction occurs, it will reduce the flowability of the mixture when it is used for casting, and the resulting molds and cores will have reduced strength.

The bench life of the mixture of the sand and polyurethane-forming binder composition is the time period between forming the mixture of the sand and polyurethane-forming binder and the time when the mixture is no longer useful for making acceptable molds and cores. A measure of mold and core acceptability is tensile strength. If a mixture of sand and polyurethane forming binder composition is used after the bench life has expired, the resulting molds and cores will have insufficient tensile strength.

Because it is not always possible to use the mixture of sand and polyurethane-forming binder composition immediately after mixing, it is desirable to prepare mixtures with an extended bench life.

DISCLOSURE OF THE INVENTION

This invention relates to a polyurethane-forming composition comprising in admixture:
(a) a resole phenolic resin component;
(b) a polyisocyanate hardener component; and
(c) an effective bench life extending amount of a carboxylic acid having at least one carboxyl group which is bonded to another carboxyl group, or is bonded to a carbon atom which is bonded to a hydroxyl group or a tertiary amino group.

The polyurethane-forming binder compositions are useful in the foundry industry. When mixed with sand and cured with a gaseous curing agent, they form molds and cores useful in casting metal parts. The mixture of sand and polyurethane-forming binder composition have an extended bench life due to the presence of the carboxylic acid.

BEST MODE AND OTHER MODES FOR PRACTICING THE INVENTION

The resole phenolic resin component comprises a resole phenolic resin, and preferably a solvent. It may also contain various optional ingredients such as adhesion promoters and release agents.

The resole phenolic resin is prepared by reacting an excess of aldehyde with a phenol in the presence of either an alkaline catalyst or a metal catalyst.

The preferred phenolic resins used to form the subject binder compositions are well known in the art, and are specifically described in U.S. Pat. No. 3,485,797 which is hereby incorporated by reference.

These resins are the reaction products of an aldehyde with a phenol. They contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium.

The phenols may be represented by the following structural formula:

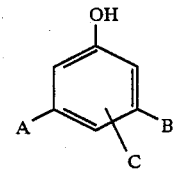

wherein A, B, and C are hydrogen atoms, or hydroxyl radicals, or hydrocarbon radicals or oxyhydrocarbon radicals, or halogen atoms, or combinations of these.

The phenol may be a multiple ring phenol such as bisphenol A. The phenolic resin is preferably non-aqueous. By "non-aqueous" is meant a phenolic resin which contains water in amounts of no more than about 10%, preferably no more than about 1% based on the weight of the resin. The phenolic resin component preferably includes benzylic ether resins.

The aldehyde has the formula R'CHO wherein R' is a hydrogen or hydrocarbon radical of 1 to 8 carbon atoms.

By "phenolic resin" is meant the reaction product of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents, and/or other ingredients present, and so forth). The reaction products, that is the phenolic resin, will be a mixture of different molecules and may contain in widely varying ratios addition products, condensation products, and unreacted reactants such as unreacted phenol and/or unreacted aldehyde.

By "addition product" is meant reaction products in which an organic group has been substituted for at least one hydrogen of a previously unreacted phenol or of a condensation product.

By "condensation product" is meant reaction products that link two or more aromatic rings.

The phenolic resins are substantially free of water and are organic solvent soluble. The phenolic component includes any one or more of the phenols which have heretofore been employed in the formation of phenolic resins and which are not substituted at either the two ortho-positions or at one ortho-position and the para-position such as unsubstituted positions being necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable. Such phenols can be described by the general formula:

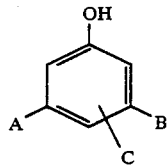

wherein A, B, and C are hydrogen atoms, or hydroxyl radicals, or hydrocarbon radicals, or oxyhydrocarbon radicals, or halogen atoms, or combinations of these.

The phenol reactant is preferably reacted with an aldehyde to form phenolic resins and more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resin used must be liquid or organic solvent-suitable. Solubility in an organic solvent is desirable to achieve uniform distribution of the binder on the aggregate.

The substantial absence of water in the phenolic resin is desirable in view of the reactivity of the binder composition of the present invention with water. Mixtures of phenolic resins can be used.

The phenolic resin component of the binder composition is, as indicated above, generally employed as a solution in an organic solvent. The nature and the effect of the solvent will be more specifically described later. The amount of solvent used should be sufficient to result in a binder composition permitting uniform coating thereof on the aggregate and uniform reaction of the mixture. The specific solvent concentration for the phenolic resins will vary depending on the type of phenolic resins employed and its molecular weight. In general, the solvent concentration will be in the range of up to 80% by weight of the resin solution and preferably in the range of 20% to 80%. It is preferred to keep the viscosity of the phenolic component at less than X-1 on the Gardner-Holt Scale.

The isocyanate hardener component of the binder composition is a polyisocyanate having a functionality of two or more, preferably 2 to 5. It may be aliphatic, cycloaliphatic aromatic, or a hybrid polyisocyanate. Mixtures of such polyisocyanates may be used. Also, it is contemplated that prepolymers and quasiprepolymers of polyisocyanates can be used. These are formed by reacting excess polyisocyanate with compounds having two or more active hydrogen atoms, as determined by the Zerewitinoff method. Optional ingredients such as release agents may also be used in the isocyanate hardener component.

Representative examples of polyisocyanates which can be used are aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to cause the curing of the phenolic resin when gassed with the curing catalyst. In general the isocyanate ratio of the polyisocyanate to the hydroxyl of the phenolic resin is from 1.25:1 to 1:1.25, preferably about 1:1. Expressed as weight percent, the amount of polyisocyanate used is from 10 to 500 weight percent, preferably 20 to 300 weight percent, based on the weight of the phenolic resin.

The polyisocyanate is used in a liquid form. Solid or viscous polyisocyanate must be used in the form of organic solvent solutions, the solvent generally being present in a range of up to 80 percent by weight of the solution.

Those skilled in the art will know how to select specific solvents for the phenolic resin component and polyisocyanate hardener component. It is known that the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanate. Aromatic solvents, although compatible with the polyisocyanate, are less compatible with the phenolic results. It is, therefore, preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range of 138° C. to 232° C.

The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and "Texanol".

In addition, the solvent component can include drying oils such as disclosed in U.S. Pat. No. 4,268,425. Such drying oils include glycerides of fatty acids which contain two or more double bonds whereby oxygen on exposure to air can be absorbed to give peroxides which catalyze the polymerization of the unsaturated portions.

Examples of some natural drying oils include soybean oil, sunflower oil, hemp oil, linseed oil, tung oil, oiticia oil, and fish oils, and dehydrated castor oil, as well as the various known modifications thereof (e.g., the heat bodied, air-blown, or oxygen-blow oils such as blown linseed oil and blown soybean oil). The above discussion concerning the oils is not intended to imply that such actually cure in the present system by air drying, but is intended to help define the drying oils.

Also, esters of ethylenically unsaturated fatty acids such as tall oil esters of polyhydric alcohols such as glycerine or pentaerythritol or monohydric alcohols such as methyl and ethyl alcohols can be employed as the drying oil. If desired, mixtures of drying oils can be employed. The preferred drying oil when employed in the present invention is linseed oil.

The amount of drying oil employed is generally at least about 2%, more generally about 2% to about 15%, and most usually about 4% to about 10% by weight based upon the total of the components in the binder composition.

In addition, the solvent component can include liquid dialkyl esters such as dialkyl phthalate of the type disclosed in U.S. Pat. No. 3,905,934. Such preferably have the structure:

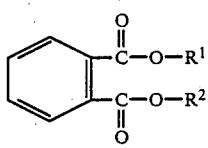

where $R^1$ and $R^2$ are alkyl radicals of 1 to 12 carbon atoms and the total number of carbon atoms in the R groups does not exceed 16. More usually $R^1$ and $R^2$ are alkyl radicals of 3 to 6 carbon atoms and the total number of carbon atoms in $R^1$ and $R^2$ is between 6 and 12. Thus, in the above structural formula either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing.

Other dialkyl esters include dimethyl glutarate such as available from Du Pont under the trade designation DBE-5; dimethyl adipate, available from Du Pont under the trade designation DBE-6; dimethyl succinate; and mixtures of such esters which are available from Du Pont under the trade designation DBE, and dialkyl adipates and succinates with alcohols up to 12 carbon atoms.

The carboxylic acids which are used as bench life extenders have at least one carboxyl group which is bonded to another carboxyl group, or is bonded to a carbon atom which is bonded to a hydroxyl group or a tertiary amino group.

Examples of such carboxylic acids and their chemical formulae are listed below:
NAME: Lactic acid
FORMULA: $CH_3CH(OH)CO_2H$
NAME: Oxalic acid
FORMULA: $HO_2CCO_2H$
NAME: Citric acid
FORMULA: $HO_2CC(OH)(CH_2CO_2H)_2$
NAME: d-Tartaric acid
FORMULA: $HO_2CCH(OH)CH(OH)CO_2H$
NAME: Diethylenetriamine pentaacetic acid (DTPA)
FORMULA: $HO_2CCH_2N[CH_2CH_2N(CH_2CO_2H)_2]_2$
NAME: N-Hydroxyethylenediamine triacetic acid (HEDTA)
FORMULA: $(HO_2CCH_2)_2NCH_2CH_2N(CH_2CO_2H)CH_2CH_2OH$ These carboxylic acids have all been found to extend the bench life of the polyurethane-forming binder compositions under consideration. All of them have the defined limitations regarding the type and location of functional groups. Citric acid is the preferred bench life extender.

The bench life extenders are usually added to the phenolic resin component, and are used in amounts sufficient to extend the bench life of the polyurethane-forming binder composition. Generally, this will be in an amount of 0.1 to 5.0 weight percent, preferably 0.4 to 2.0 weight percent based upon the weight of the resin component. Naturally, greater amounts can be used, but it is not likely that additional performance will result above 10.0 weight percent.

The bench life extenders must have sufficient solubility in the binder to enable them to perform effectively as bench life extenders. It is often desirable to predissolve the bench life extender in a polar solvent such as N,N-dimethylformamide or N-methylpyrrolidinone before adding them to the binder.

The binder compositions are preferably made available as a two-package system with the phenolic resin in one package and the isocyanate component in the other package. Usually, the binder components are combined and then admixed with sand or a similar aggregate to form the molding mix or the mix can also be formed by sequentially admixing the components with the aggregate. Methods of distributing the binder on the aggregate particles are well-known to those skilled in the art. The mix can, optionally, contain other ingredients such as iron oxide, ground flax fibers, wood cereals, pitch, refractory flours, and the like.

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes," as used herein, refers to foundry shapes which have sufficient porosity to permit escape of volatiles from it during the casting operation.

Generally, at least about 80% and preferably about 90% by weight of aggregate employed for foundry shapes has an average particle size no smaller than about 0.1 mm. The aggregate for foundry shapes preferably has an average particle size between about 0.1 mm and about 0.25 mm. The preferred aggregate employed for ordinary foundry shapes is silica wherein at least about 70 weight percent and preferably at least about 85 weight percent of the sand is silica. Other suitable aggregate materials include zircon, olivine, aluminosilicate, sand, chromite sand, and the like.

When preparing a shape for precision casting, the predominant portion and generally at least about 80% of the aggregate has an average particle size no larger than 0.1 mm and preferably between about 0.04 and 0.075 mm. Preferably at least about 90% by weight of the aggregate for precision casting applications has a particle size no larger than 0.1 mm and preferably between 0.04 mm and 0.075 mm. The preferred aggregates employed for precision casting applications are fused quartz, zircon sands, magnesium silicate sands such as olivine, and aluminosilicate sands.

When preparing a refractory such as a ceramic the predominant portion and at least 80 weight percent of the aggregate employed has an average particle size under 0.075 mm and preferably no smaller than 0.04 mm. Preferably at least about 90% by weight of the aggregate for a refractory has an average particle size under 0.075 mm and preferably no smaller than 0.04 mm. The aggregate employed in the preparation of refractories must be capable of withstanding the curing temperatures such as above about 815° C. which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and ceramics.

Examples of some abrasive grains for preparing abrasive articles include aluminum oxide, silicon carbide, boron carbide, corundum, garnet, emery, and mixtures thereof. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 0.075 mm. It is most preferred that at least about 95% of the inorganic filler has an average particle size no greater than 0.075 mm. Some inorganic fillers include cryolite, fluorospar, silica, and the like. When an inorganic filler is employed along with the abrasive grit, it is generally present in amounts from about 1% to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

In molding compositions, the aggregate constitutes the major constituent and the binder constitutes a relatively minor amount. In ordinary sand type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand-type foundry shapes.

In molds and cores for precision casting applications the amount of binder is generally no greater than about 40% by weight and frequently within the range of about 5% to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to about 1 weight percent based on the weight of the sand can be tolerated. This is particularly true if the solvent employed is non-water-miscible or if an excess of the polyisocyanate necessary for curing is employed since such excess polyisocyanate will react with the water.

The molding mix is molded into the desired shape, whereupon it can be cured. Curing can be affected by passing a tertiary amine through the molded mix as described in U.S. Pat. No. 3,409,579.

A valuable additive to the binder compositions of the present invention in certain types of sand is a silane such as those having the general formula:

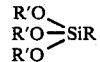

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The aforesaid silane, when employed in concentrations of 0.1% to 2%, based on the phenolic binder and hardener, improves the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-aminopropyltrimethoxy silane); and Union Carbide A-1160 (Ureido-silane).

EXAMPLES

The examples which follow will illustrate specific embodiments of the invention. These examples along with the written description will enable one skilled in the art to practice the invention. It is contemplated that many equivalent embodiments of the invention will be operable besides these specifically disclosed. In all of the examples the foundry samples are cured by the cold-box process by contacting with dimethylethylamine. All parts are by weight and all temperatures are in degrees centigrade unless otherwise specified.

COMPARISON EXAMPLE

The first example is a comparison example. The formulation will not contain a bench life extender, and is designed to provide a frame of reference from which to evaluate the effectiveness of the bench life extenders within the scope of this invention.

In a mixing vessel, 100 parts by weight of Manley 1L-5W sand are admixed with about 0.825 parts of a phenolic resin component, commercially available from Ashland Chemical under the trade designation Isocure® I 308, which contains about 58% by weight of a phenolic resole benzylic ether, and about 42% by weight of a solvent mixture of aromatic hydrocarbon, kerosene, ester, and release agent. To the mixture is admixed about 0.675 part of isocyanate composition, commercially available from Ashland Chemical under the trade designation Isocure® II 606, containing about 78% by weight of polymethylene polyphenyl isocyanate, and about 22% by weight of a solvent mixture of kerosene and an aromatic solvent for about 2 minutes. The resulting foundry mix is forced into a dogbone shaped core box by blowing. It is then contacted with a 12% by volume mix of dimethylethylamine in $CO_2$ at 40 psi for 1 second, followed by purging with air that is at 60 psi for about 4 seconds, thereby forming AFS tensile strength samples (dog bones) using the standard procedure.

Measuring the tensile strength of the dog bone samples enables one to predict how the mixture of sand and polyurethane-forming binder will work in actual foundry operations. Lower tensile strengths for the samples indicate that the phenolic resin and polyisocyanate reacted more extensively prior to curing.

In the examples which follow, the tensile strengths were measured immediately and 24 hours after curing at zero bench time, after 3 hours of bench time and after 5 hours of bench time at ambient conditions in closed containers. The dogbone samples that were tested 24 hours after curing were stored at a relative humidity of 50% and a temperature of 25° C. Tensile strengths at these times are given in Table I, which follows Examples 1–7.

EXAMPLES 1–7

In Examples 1–7 the procedure of the comparison example was followed except various bench life extenders were added to the resin component. The identity, amount, and solvent used with the bench life extender is given in Table I.

The tensile strengths shown in Table I for the various dog bone samples, indicate that the reference samples (without the carboxylic acid bench life extender) had high tensile strengths when prepared from a molding mixture at zero bench life. However, the tensile strength dropped off quickly when the molding mixture used had three hours of bench life. After five hours, the tensile strength of samples prepared with the mixture was only 72 psi when measured immediately after curing.

On the other hand, Table I shows that tensile strength of the samples prepared with a molding mixture containing the carboxylic acid bench life extenders was lower at first, but did not drop off as rapidly when the mixture was allowed to set before curing. In fact all of the samples tested had a tensile strength of at least 90 psi, and in all cases but one, a tensile strength greater than 100 psi after waiting five hours to cure the mixture and measuring the tensile strength immediately after curing.

This improved tensile strength measured after the mixture had a bench life of five hours and measured immediately after curing is significant. One can predict that such molding mixtures will be more suitable for use in the foundry operation than those without the carboxylic acid bench life extender.

Usually such molding mixtures will remain flowable even when left overnight in core blowers. This attribute is important because it is not always possible to use all of the mixture before the end of the day.

TABLE I*

| | BENCH LIFE EXTENDER | | | TENSILE STRENGTH, PSI | | | | | |
| | Name of | Wt. % based on resin | Acid Equiv. per 100 g resin | ZERO BENCH | | 3 HR BENCH | | 5 HR BENCH | |
| EXAMPLE | Carboxylic Acid | component | component | IMM | 24 HR | IMM | 24 HR | IMM | 24 HR |
|---|---|---|---|---|---|---|---|---|---|
| Comparison | None | 0 | 0 | 169 | 314 | 60 | 131 | 50 | 86 |
| 1 | 50% Citric Acid in DMF | 2.62 | 0.0205 | 135 | 181 | 110 | 126 | 92 | 122 |
| 2 | 50% D-Tartaric Acid in DMF | 3.07 | 0.0205 | 143 | 206 | 109 | 203 | 106 | 171 |
| 3 | 50% Oxalic Acid in DMF | 0.92 | 0.010 | 150 | 265 | 118 | 214 | 102 | 185 |
| 4 | 50% Citric Acid in NMP | 2.62 | 0.0205 | 149 | 229 | 125 | 203 | 112 | 194 |
| 5 | 50% D-Tartaric Acid in NMP | 3.07 | 0.0205 | 152 | 215 | 129 | 181 | 116 | 163 |
| 6 | 40% Oxalic Acid in NMP | 2.30 | 0.0205 | 147 | 242 | 126 | 202 | 116 | 198 |
| 7 | 25% DTPA in NMP | 3.09 | 0.0098 | 150 | 229 | 110 | 153 | 102 | 133 |

*Abbreviations used in Table I and II:
DTPA = diethylenetriamine-N,N,N',N", N"'—pentaacetic acid
DMF = N,N—dimethylformamide
NMP = N—methylpyrrolidinone Several other carboxylic acids were also tested and compared to citric acid. The results of this comparison are shown in Table II which follows.

The data in Table II show that carboxylic acid tested outside the scope of this invention were not as effective as citric acid as bench life extenders for the formulation.

TABLE II

| | BENCH LIFE EXTENDER | | | TENSILE STRENGTH, PSI | | | | | |
| | Name of | Wt. % based on resin | Acid Equiv. per 100 g resin | ZERO BENCH | | 3 HR BENCH | | 5 HR BENCH | |
| EXAMPLE* | Carboxylic Acid | component | component | IMM | 24 HR | IMM | 24 HR | IMM | 24 HR |
|---|---|---|---|---|---|---|---|---|---|
| 8 | 40.5% Citric Acid in NMP | 1.5 | 0.0095 | 148 | 225 | 128 | 189 | 112 | 177 |
| 9-C | 38.5% Succinic Acid in NMP | 1.5 | 0.0095 | 167 | 249 | 101 | 162 | 70 | 120 |
| 10-C | 59.4% Salicylic Acid in NMP | 2.2 | 0.0095 | 167 | 263 | 98 | 160 | 83 | 116 |
| 11-C | 40.8% Itaconic Acid | 1.5 | 0.0095 | 163 | 250 | 87 | 151 | 65 | 116 |

TABLE II-continued

| | BENCH LIFE EXTENDER | | | TENSILE STRENGTH, PSI | | | | | |
| | | Wt. % based | Acid Equiv. | ZERO BENCH | | 3 HR BENCH | | 5 HR BENCH | |
| | Name of | on resin | per 100 g resin | | | | | | |
| EXAMPLE* | Carboxylic Acid | component | component | IMM | 24 HR | IMM | 24 HR | IMM | 24 HR |
| --- | --- | --- | --- | --- | --- | --- | --- | --- | --- |
| | in NMP | | | | | | | | |
| 12-C | 50% Acetic Acid in DMF | 2.46 | 0.0205 | 156 | 276 | 64 | 91 | N.D. | N.D. |
| 13-C | Acetic Acid | 1.23 | 0.0205 | 149 | 260 | N.D. | 151 | 47 | 93 |

*C after the number indicates example was a comparison example.

We claim:

1. A cold-box process for the fabrication of foundry shape which comprises:
   (a) mixing a foundry aggregate with a bonding amount of up to about 10% by weight, based upon the weight of the aggregate, of a binder composition comprising in admixture
      (1) a resole phenolic resin component;
      (2) a polyisocyanate hardener component; and
      (3) an effective bench life extending amount of a carboxylic acid having at least one carboxyl group which is bonded to another carboxyl group, or is bonded to a carbon atom which is bonded to a hydroxyl group or a tertiary amino group;
   (b) introducing the foundary mix obtained from step (a) into a pattern;
   (c) hardening the foundry mix in the pattern with a gaseous tertiary amine to become self-supporting; and
   (d) thereafter removing the shaped foundry mix of step (c) from the pattern.

2. The process of claim 1 wherein the resole resin component of the binder composition comprises a resole phenolic resin prepared by reacting an aldehyde with a phenol in the presence of a metal catalyst such that the molar ratio of aldehyde to phenol is form 1.1:1 to 3:1.

3. The process of claim 2 wherein the metal catalyst is a divalent metal catalyst.

4. The process of claim 3 wherein the phenol used to prepare the resole resin is selected from the group consisting of phenol, o-cresol, m-cresol, and mixtures thereof.

5. The process of claim 4 wherein the aldehyde used to prepare the resole resin is formaldehyde.

6. The process of claim 5 wherein the carboxylic acid of the binder composition is selected from the group consisting of citric acid, tartaric acid, lactic acid, dietdhylenetriamine penetaacetic acid, and n-hydroxyethylenediamine triacetic acid.

7. The process of claim 6 wherein the carboxylic acid is used in an amount of 0.01 to 0.5 weight percent based upon the weight of the resin component.

8. The process of claim 7 wherein the ratio of hydroxyl groups of the phenolic resin to the isocyanate groups of the binder is form 1.25:1 to 1:1.25.

9. The process of claim 8 wherein the phenolic resin contains a solvent in which the resin is soluble.

10. The process of claim 6 wherein the carboxylic acid is citric acid.

* * * * *